United States Patent
Kuan et al.

(10) Patent No.: US 11,769,348 B2
(45) Date of Patent: Sep. 26, 2023

(54) FACE RECOGNITION METHOD AND EDGE DEVICE

(71) Applicant: Digital System Integration Co., Ltd., Taipei (TW)

(72) Inventors: Yu-Kai Kuan, Taipei (TW); Yu-Che Tsai, Taipei (TW)

(73) Assignee: DIGITAL SYSTEM INTEGRATION CO., LTD., Taipei (TW)

( * ) Notice: Subject to any disclaimer, the term of this patent is extended or adjusted under 35 U.S.C. 154(b) by 233 days.

(21) Appl. No.: 17/410,476

(22) Filed: Aug. 24, 2021

(65) Prior Publication Data
US 2022/0067349 A1  Mar. 3, 2022

(30) Foreign Application Priority Data
Aug. 25, 2020  (TW) ................................ 109129010

(51) Int. Cl.
| | |
|---|---|
| *G06V 40/16* | (2022.01) |
| *H04W 84/12* | (2009.01) |
| *G06N 3/08* | (2023.01) |
| *G06V 40/40* | (2022.01) |

(52) U.S. Cl.
CPC ............. *G06V 40/172* (2022.01); *G06N 3/08* (2013.01); *G06V 40/162* (2022.01); *G06V 40/168* (2022.01); *G06V 40/45* (2022.01); *H04W 84/12* (2013.01)

(58) Field of Classification Search
CPC .. G06V 40/172; G06V 40/162; G06V 40/168; G06V 40/45; G06V 10/454; G06V 10/82; G06N 3/08; G06N 3/045; H04W 84/12
See application file for complete search history.

(56) References Cited

U.S. PATENT DOCUMENTS

| | | | |
|---|---|---|---|
| 7,469,060 B2 | 12/2008 | Bazakos et al. | |
| 9,202,105 B1 | 12/2015 | Wang et al. | |
| 2019/0130171 A1* | 5/2019 | Alameh | G06V 20/64 |
| 2020/0342245 A1* | 10/2020 | Lubin | G06V 40/70 |
| 2021/0287469 A1* | 9/2021 | Ryhorchuk | G06V 40/172 |

FOREIGN PATENT DOCUMENTS

| | | |
|---|---|---|
| CN | 104408798 A | 3/2015 |
| CN | 106951867 A | 7/2017 |

* cited by examiner

*Primary Examiner* — Phuoc Tran
(74) *Attorney, Agent, or Firm* — KIRTON McCONKIE; Evan R. Witt

(57) ABSTRACT

A face recognition method for an edge device is provided. Firstly, a recognition data is received from a computing device through a wireless network. Then, a trained model is retrieved from the recognition data. Then, the trained model is stored. Then, a face detection operation is performed to acquire a face image and a face temperature of a detected face. When the face temperature is within a human body temperature range and the face image complies with the trained model, the edge device confirms that the detected face is a face of a real person and the real person is a known user.

15 Claims, 7 Drawing Sheets

FACE RECOGNITION METHOD AND EDGE DEVICE

FIELD OF THE INVENTION

The present invention relates to a recognition method, and more particularly to a face recognition method and an edge device using the face recognition method.

BACKGROUND OF THE INVENTION

In recent years, network-related technologies such as the Internet of Things (IoT) or mobile communication networks have continuously developed to bring people more convenient lives.

For example, an intelligent access control system has a significant change and improvement when compared with the conventional access control system. The intelligent access control system can perform face recognition automatically. After the judging condition is satisfied, the intelligent access control system performs corresponding actions without the need of the manual recognition and control.

However, the conventional intelligent access control system still has many drawbacks. For example, since the installation of the conventional intelligent access control system need a lot of wires, the installation process is not easy and the installation cost is high. Moreover, since the judgment mechanism of the intelligent access control system is usually too simple, the person having a similar face shape or the person wearing a headgear may be authenticated. In other words, the judgment mechanism of the intelligent access control system may lead to security concerns.

Therefore, there is a need of providing an edge device and an improved face recognition method for the edge device in order to overcome the drawbacks of the conventional technologies.

SUMMARY OF THE INVENTION

An object of the present invention provides a face recognition method and an edge device. By the face recognition method and the edge device, the installation demands on the wires are reduced. Consequently, the installation difficulty and the installation cost are largely reduced. In addition, the face recognition method can effectively recognize the face of the real person.

Another object of the present invention provides a face recognition method and an edge device. By the face recognition method and the edge device, the accuracy of the judging result is increased and the information security is effectively enhanced.

In accordance with an aspect of the present invention, a face recognition method for an edge device is provided. Firstly, a recognition data is received from a computing device through a wireless network. Then, a trained model is retrieved from the recognition data. Then, the trained model is stored. Then, a face detection operation is performed to acquire a face image and a face temperature of a detected face. When the face temperature is within a human body temperature range and the face image complies with the trained model, the edge device confirms that the detected face is a face of a real person and the real person is a known user.

In accordance with another aspect of the present invention, an edge device is provided. The edge device includes a control module, a wireless communication module, a storage module, an image capture module and a temperature sensor. The wireless communication module connected with the control module. The wireless communication module receives a recognition data from a computing device through a wireless network. The control module retrieves a trained model from the recognition data. The storage module is connected with the control module. The trained model is stored in the storage module. The image capture module is connected with the control module. The image capture module captures a detected face to acquire a face image. The temperature sensor is connected with the control module. The temperature sensor senses a face temperature of the detected face. When the face temperature is higher than 35 degrees Celsius and lower than 42 degrees Celsius and the face image complies with the trained model, the control module confirms that the face is a face of a real person and the real person is a known user.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
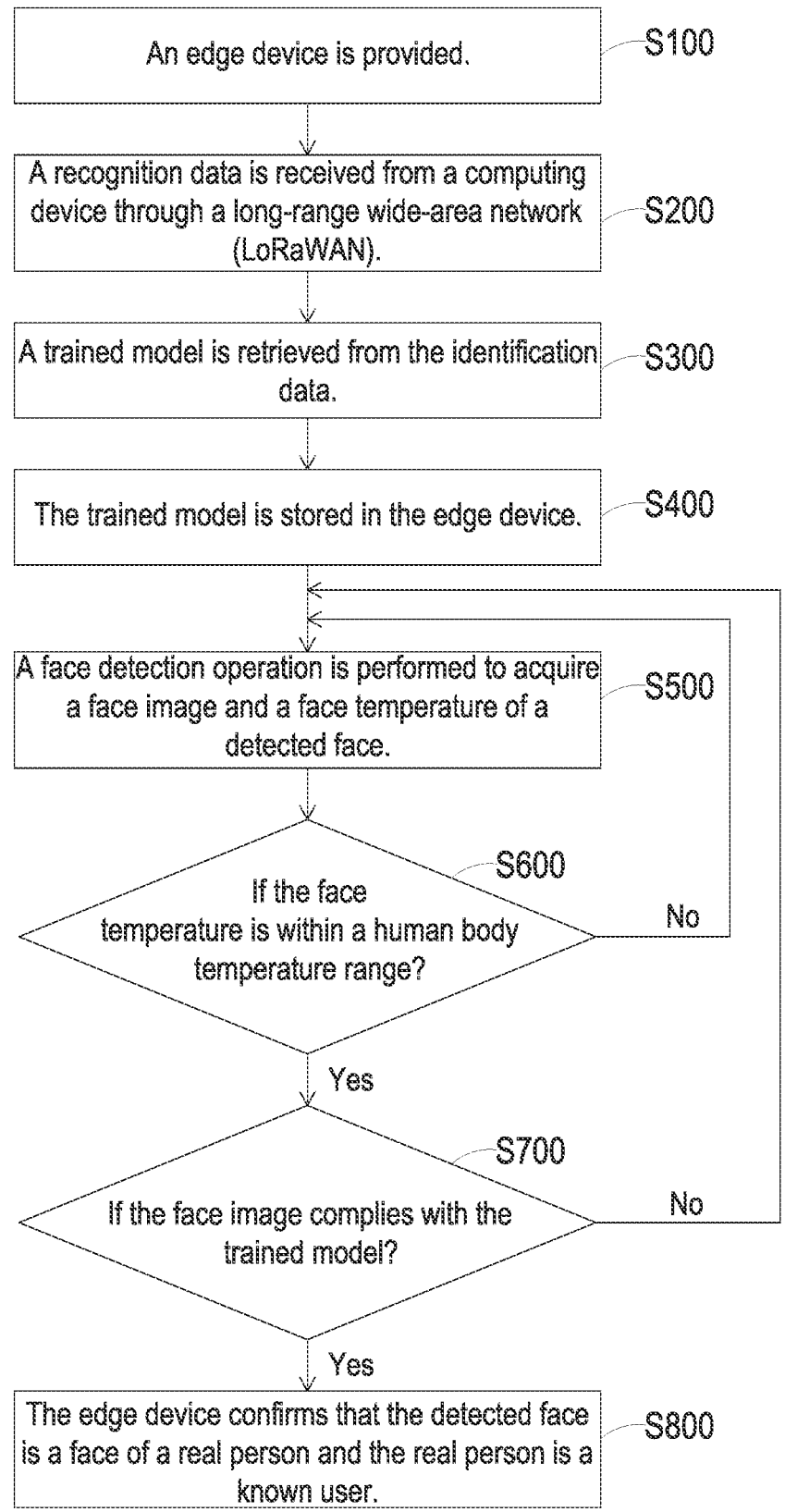
FIG. 1 is a flowchart illustrating a face recognition method according to an embodiment of the present invention.

Please refer to FIG. 1. FIG. 1 is a flowchart illustrating a face recognition method according to an embodiment of the present invention. The face recognition method includes the following steps.

Firstly, in a step S100, an edge device is provided. An example of the edge device includes but is not limited to an intelligent access control device or an intelligent doorbell.

Then, in a step S200, a recognition data is received through a wireless network. For example, the recognition data is received from a computing device, which will be described later. In an embodiment, the wireless network is a long-range wide-area network (LoRaWAN).

Then, in a step S300, a trained model is retrieved from the recognition data. In an embodiment, the trained model is pre-trained by using a deep learning algorithm through a Convolutional Neural Network (CNN), but not limited thereto.

Then, in a step S400, the trained model is stored in the edge device.

Then, in a step S500, a face detection operation is performed to acquire a face image and a face temperature of a detected face.

Then, a step S600 is performed to judge whether the face temperature is within a human body temperature range. Preferably but not exclusively, the human body temperature is between 35 degrees Celsius and 42 degrees Celsius.

If the judging condition of the step S600 is satisfied, a step S700 is performed to judge whether the face image complies with the trained model. Whereas, if the judging condition of the step S600 is not satisfied, the step S500 is repeatedly done.

If the judging condition of the step S700 is satisfied, a step S800 is performed. In the step S800, the edge device confirms that the detected face is a face of a real person and the real person is a known user. Whereas, if the judging condition of the step S700 is not satisfied, the step S500 is repeatedly done.

From the above descriptions, the face recognition method of the present invention uses the wireless network to transfer data. Since the installation demands on the wires are reduced, the installation difficulty and the installation cost are largely reduced. Moreover, the face recognition method of the present invention implements multiple judgements according to the results of the face image recognition and the face temperature detection. Consequently, the face of the real person can be effectively recognized.

Preferably but not exclusively, the wireless network is the long-range wide-area network (LoRaWAN). The signal frequency of the long-range wide-area network (LoRaWAN) is 433, 868 or 915 Megahertz (MHz). The diameter of the communication range of the long-range wide-area network (LoRaWAN) is 1 km. Generally, the communication capacity of the long-range wide-area network (LoRaWAN) can reach more than 20 kilometers in diameter. In some embodiments of the present invention, the communication capacity is limited to 1 km in diameter. Since the cost and the signal interference are reduced, a more secure and stable communication environment can be established.

Figure 2:
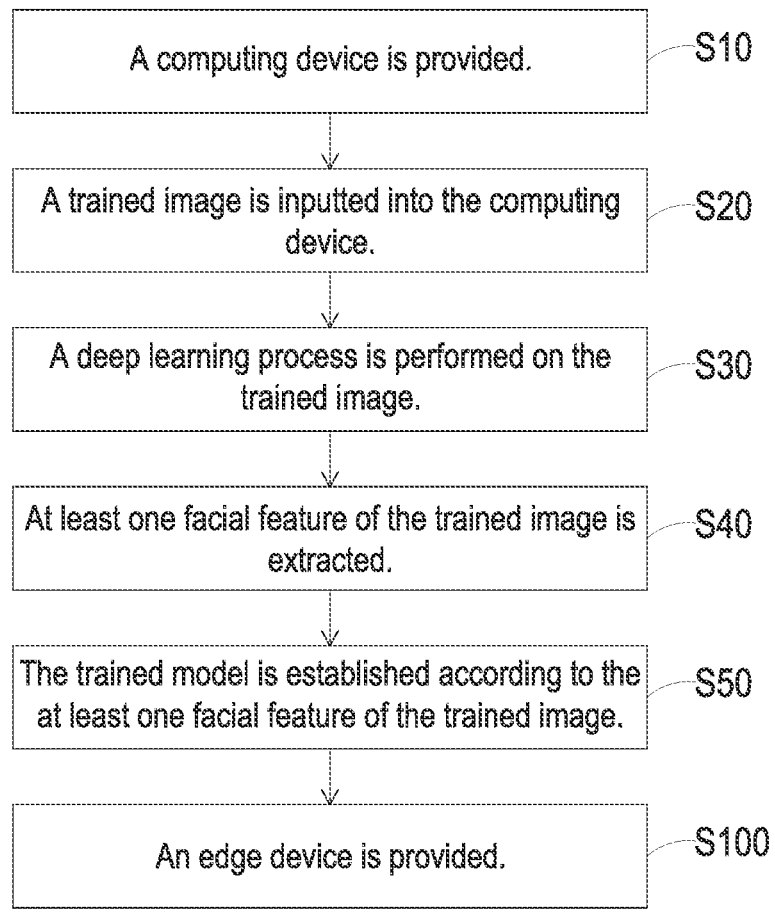
FIG. 2 is a flowchart illustrating an exemplary process of establishing the trained model in the face recognition method according to the embodiment of the present invention.

Please refer to FIGS. 1 and 2. FIG. 2 is a flowchart illustrating an exemplary process of establishing the trained model in the face recognition method according to the embodiment of the present invention. Before the step S100, the face recognition method further includes steps S10~S50. In the step S10~S50, the trained model is established by the computing device.

In the step S10, the computing device is provided. An example of the computing device includes but is not limited to a personal computer, a notebook computer, a tablet computer or a server.

Then, in the step S20, a trained image is inputted into the computing device. In an embodiment, the trained image is inputted into the computing device in the form of a picture file after taken by an external camera. Alternatively, the trained image is acquired from an image capture device that is connected with a computing device and directly inputted into the computing device.

Then, in the step S30, a deep learning process is performed on the trained image. Preferably but not exclusively, the step S30 is implemented by using a deep learning algorithm.

Then, in the step S40, at least one facial feature of the trained image is extracted. For example, a feature point is extracted.

Then, in the step S50, the trained model is established according to the at least one facial feature of the trained image.

Figure 3:
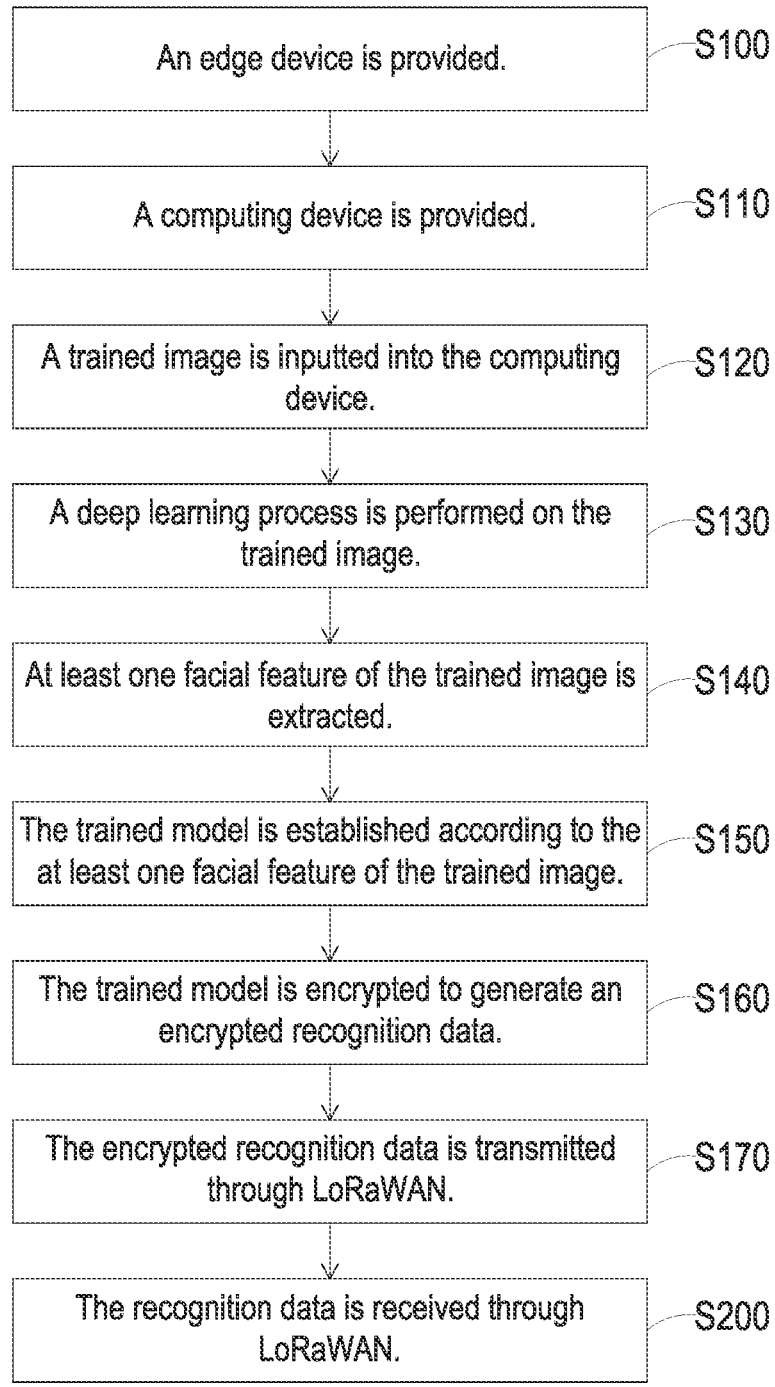
FIG. 3 is a flowchart illustrating an exemplary process of establishing the trained model and encrypting the trained model in the face recognition method according to the embodiment of the present invention.

In some embodiments, the trained model can be further encrypted. FIG. 3 is a flowchart illustrating an exemplary process of establishing the trained model and encrypting the trained model in the face recognition method according to the embodiment of the present invention. After the step S100 and before the step S200, the steps S110~170 are performed.

The steps S110~S150 are similar to the steps S10~S50. In the step S110, the computing device is provided. In the step S120, a trained image is inputted into the computing device. In the step S130, a deep learning process is performed according to the trained image. In the step S140, at least one facial feature of the trained image is extracted. In the step S150, the trained model is established according to the at least one facial feature of the trained image.

In the step S160, the trained model is encrypted to generate an encrypted recognition data.

In the step S170, the encrypted recognition data is transmitted through the wireless network (e.g., LoRaWAN).

Figure 4:
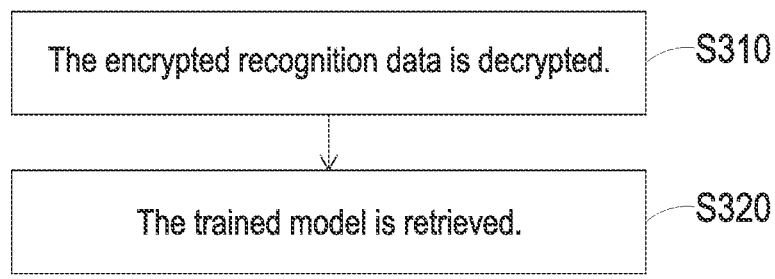
FIG. 4 is a flowchart illustrating an example of the Step S300 in the face recognition method according to the embodiment of the present invention.

As mentioned above, the recognition data received in the step S200 may be an encrypted recognition data or an unencrypted recognition data from the data source. Please refer to FIGS. 1, 3, and 4. FIG. 4 is a flowchart illustrating an example of the Step S300 in the face recognition method according to the embodiment of the present invention. As mentioned above in FIG. 3, the encrypted recognition data is transmitted in the step S170. Consequently, the encrypted recognition data is received in the step S200. After the step S200, the step S300 is performed. The step S300 includes steps S310 and 320 to decrypt the encrypted recognition data. After the encrypted recognition data is decrypted (Step S310), the trained model is retrieved (Step S320). In this embodiment, the trained model is encrypted as the encrypted recognition data and transmitted, and the encrypted recognition data is decrypted as the trained model after received by the edge device. Consequently, the information security is effectively enhanced.

Figure 5:
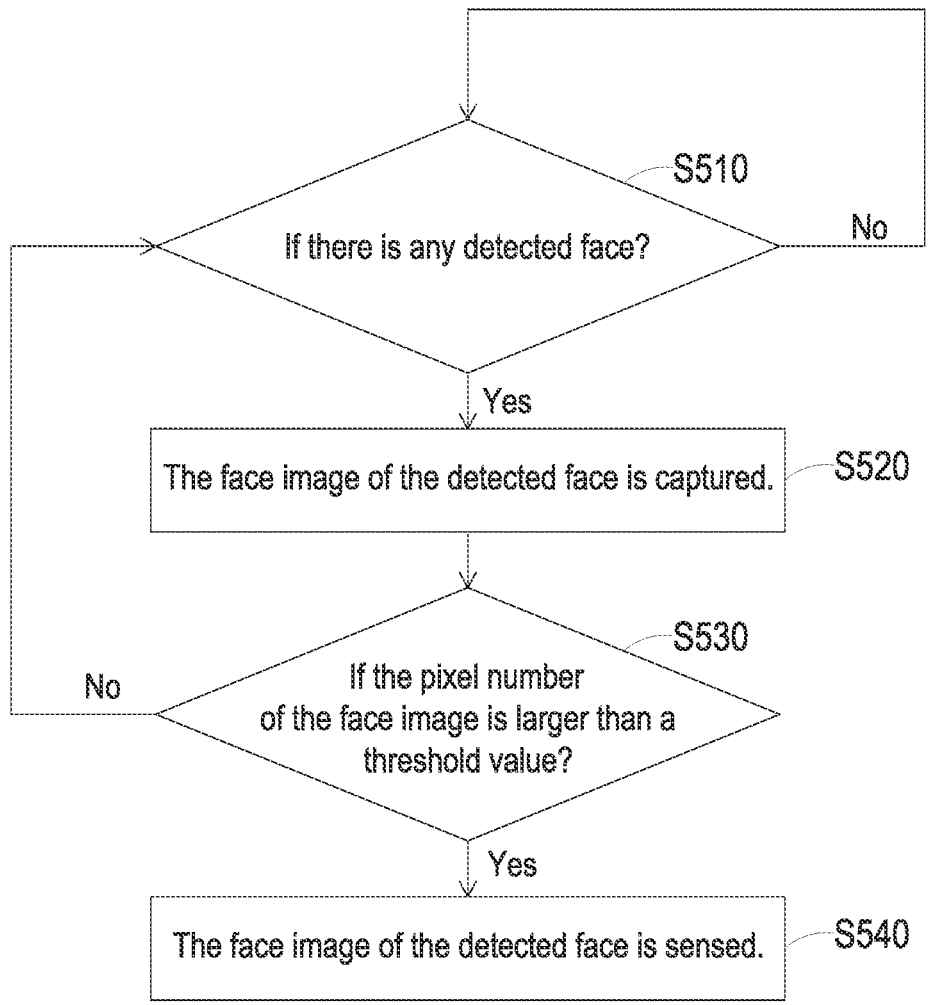
FIG. 5 is a flowchart illustrating an example of the step S500 in the face recognition method according to the embodiment of the present invention.

FIG. 5 is a flowchart illustrating the step S500 in the face recognition method according to the embodiment of the present invention. The step S500 includes steps S510~S540.

Firstly, the step S510 is performed to judge whether there is any detected face.

If the judging condition of the step S510 is not satisfied, the step S510 is repeatedly done. Whereas, if the judging condition of the step S510 is satisfied, the step S520 is performed to capture the face image of the detected face.

Then, a step S530 is performed to judge whether the pixel number of the face image is larger than a threshold value. Preferably but not exclusively, the threshold value is greater than or equal to 10,000 and less than or equal to 1,000,000. In case that the pixel number is high enough, the resolution of the face image is sufficient for recognition.

If the judging condition of the step S530 is not satisfied, the step S510 is repeatedly done. Whereas, if the judging condition of the step S530 is satisfied, the step S540 is performed to sense the face temperature of the detected face.

As mentioned above, the face recognition method of the present invention requires that the pixel number of the face image is greater than the threshold value. Since the accuracy of the judging result is increased, the security is enhanced.

Figure 6:
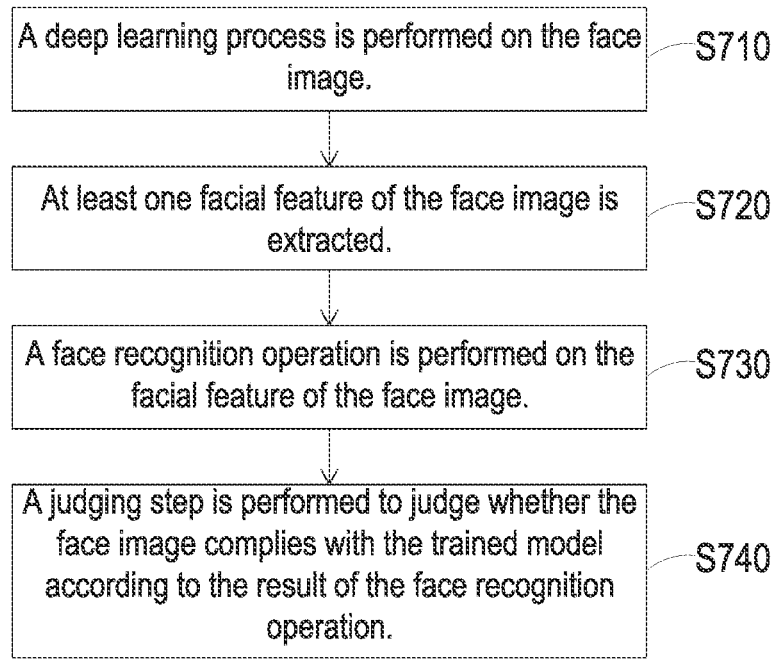
FIG. 6 is a flowchart illustrating an example of the step S700 in the face recognition method according to the embodiment of the present invention.

In some embodiments, the face recognition operation is performed according to the deep learning method. FIG. 6 is a flowchart illustrating an example of the step S700 in the face recognition method according to the embodiment of the present invention. The step S700 of the face recognition method includes steps S710~S740.

In the step S710, a deep learning process is performed on the face image. In the step S720, at least one facial feature of the face image is extracted. In the step S730, a face recognition operation is performed on the facial feature of the face image. The step S740 is performed to judge whether the face image complies with the trained model according to the result of the face recognition operation. As mentioned above, the face recognition method of the present invention can continuously train and update the trained model according to the deep learning process. Consequently, the accuracy of the recognition result is enhanced.

Figure 7:
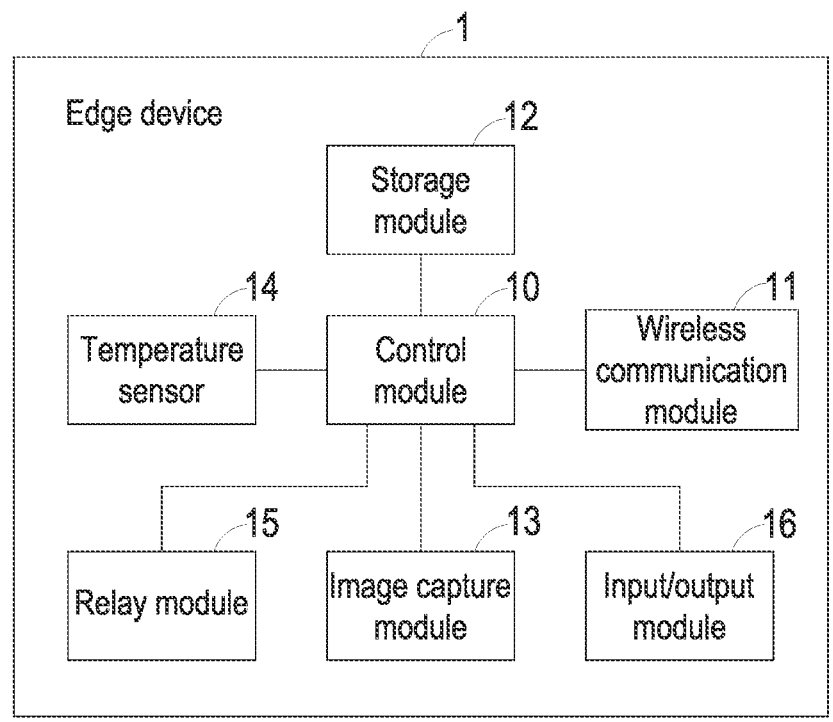
FIG. 7 is a function block diagram illustrating the architecture of an edge device using the face recognition method according to an embodiment of the present invention.

FIG. 7 is a function block diagram illustrating the architecture of an edge device using the face recognition method according to an embodiment of the present invention. As shown in FIG. 7, the edge device 1 includes a control module 10, a wireless communication module 11, a storage module 12, an image capture module 13 and a temperature sensor 14. The wireless communication module 11 is connected with the control module 10. The wireless communication module 11 receives the recognition data through a wireless network such as LoRaWAN. In some embodiments, the wireless communication module 11 is a LoRaWAN wireless module. For example, the signal frequency of the LoRaWAN is 433, 868 or 915 MHz, and the diameter of the wireless network communication range of the LoRaWAN is 1 km. The control module 10 receives the trained model from the recognition data. The storage module 12 is connected with the control module 10. The trained model is stored in the storage module 12. The image capture module 13 is connected with the control module 10. The image capture module 13 is used to capture the image of the detected face to acquire the face image. The temperature sensor 14 is connected with the control module 10. The temperature sensor 14 is used to sense the face temperature of the detected face. If the face temperature is higher than 35 degrees Celsius and lower than 42 degrees Celsius, the control module 10 judges whether the face image complies with the trained model. If the judging condition is satisfied, the control module 10 confirms that the face is a face of a real person and the real person is a known user.

Please refer to FIGS. 1 and 7 again. As mentioned above, after the step S800 of the face recognition method is completed, the control module 10 of the edge device 1 confirms that the face is a face of a real person face and the real person is a known user. In an embodiment, after the step S800 is completed, a specific function is enabled. For example, a relay module 15 connected with the control module 10 performs the action of opening the door or unlocking the door. Alternatively, an input/output module 16 connected with the control module 10 is enabled to perform the two-way language conversation. It is noted that the example of the specific function is not restricted. For example, a fever notification process and an access prohibition process are enabled according to the detection result of the temperature detection step or the detection result of the temperature sensor 14.

Please refer to FIGS. 1 to 7 again. The face recognition method of the present invention is implemented through the computing device and the edge device 1. The step S200 is implemented through the wireless communication module 11. The step S300 is implemented through the control module 10. The step S400 is implemented through the storage module 12. The step S500 is implemented through the image capture module 13 and the temperature sensor 14. The step S600 is implemented through the temperature sensor 14 and the control module 10. The step S700 is implemented through the control module 10, the storage module 12 and the image capture module 13. The step S800 is implemented through the control module 10. Moreover, the steps S10~S50 and the steps S110~S170 are implemented through the computing device. The steps S310 and S320 are implemented through the control module 10. The step S510 is implemented through the control module 10 and the image capture module 13. The step S520 is implemented through the image capture module 13. The step S530 is implemented through the control module 10. The step S540 is implemented through the temperature sensor 14. Moreover, the steps S710~S730 are implemented through the control module 10. The step S740 is implemented through the control module 10 and the storage module 12.

From the above descriptions, the present invention provides the face recognition method and the edge device. The recognition data is transferred through the wireless network such as LoRaWAN. Since the installation demands on the wires are reduced, the installation difficulty and the installation cost are largely reduced. Moreover, the face recognition method of the present invention implements multiple judgements according to the results of the face image recognition and face temperature detection. Consequently, the face of the real person can be effectively recognized. Moreover, the face recognition method of the present invention requires that the pixel number of the face image is greater than the threshold value. Since the accuracy of the judging result is increased, the security is enhanced. Optionally, the trained model is encrypted as the encrypted recognition data, and the encrypted recognition data is decrypted as the trained model after received by the edge device. Consequently, the information security is effectively enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A face recognition method for an edge device, the face recognition method comprising steps of:
   receiving a recognition data from a computing device through a wireless network;
   retrieving a trained model from the recognition data;
   storing the trained model;
   performing a face detection operation to acquire a face image and a face temperature of a detected face; and
   when the face temperature is within a human body temperature range and the face image complies with the trained model, confirming that the detected face is a face of a real person and the real person is a known user.

2. The face recognition method according to claim 1, wherein the human body temperature range is between 35 degrees Celsius and 42 degrees Celsius.

3. The face recognition method according to claim 1, wherein the computing device previously performs a trained model establishing process, and the trained model establishing process comprises steps of:
- inputting a trained image into the computing device;
- performing a deep learning process on the trained image;
- extracting at least one facial feature of the face image; and
- performing a face recognition operation on the facial feature of the face image, so that the trained model is established.

4. The face recognition method according to claim 3, wherein the trained model is encrypted as an encrypted recognition data by the computing device, and the encrypted recognition data is received by the edge device through the wireless network.

5. The face recognition method according to claim 4, wherein after the edge device receives the encrypted recognition data through the wireless network, the edge device further decrypts the encrypted recognition data as the trained model.

6. The face recognition method according to claim 1, wherein while the face detection operation is performed, when the edge device judges that a pixel number of the face image is greater than a threshold value, the edge device senses the face temperature.

7. The face recognition method according to claim 6, wherein the threshold value is greater than or equal to 10,000 and less than or equal to 1,000,000.

8. The face recognition method according to claim 1, wherein after the face image is acquired, the edge device performs a deep learning process on the face image, extracts at least one facial feature of the face image, performs a face recognition operation on the at least one facial feature of the face image, and judges whether the face image complies with the trained model according to a result of the face recognition operation.

9. The face recognition method according to claim 1, wherein the wireless network is a long-range wide-area network, wherein a signal frequency of the long-range wide-area network is 433, 868 or 915 Megahertz, and a diameter of a communication range of the long-range wide-area network is 1 km.

10. An edge device, comprising:
- a control module;
- a wireless communication module connected with the control module, wherein the wireless communication module receives a recognition data from a computing device through a wireless network, and the control module retrieves a trained model from the recognition data;
- a storage module connected with the control module, wherein the trained model is stored in the storage module;
- an image capture module connected with the control module, wherein the image capture module captures a detected face to acquire a face image; and
- a temperature sensor connected with the control module, wherein the temperature sensor senses a face temperature of the detected face,
- wherein when the face temperature is higher than 35 degrees Celsius and lower than 42 degrees Celsius and the face image complies with the trained model, the control module confirms that the face is a face of a real person and the real person is a known user.

11. The edge device according to claim 10, wherein the edge device further comprises a relay module, and the relay module is connected with the control module, wherein after the control module confirms that the face is the face of the real person and the real person is the known user, the control module controls the relay module to perform an action of opening a door or unlocking the door.

12. The edge device according to claim 10, wherein the edge device is an intelligent access control device or an intelligent doorbell.

13. The edge device according to claim 10, wherein the wireless network is a long-range wide-area network, and the wireless communication module is a long-range wide-area network communication module.

14. The edge device according to claim 13, wherein a signal frequency of the long-range wide-area network is 433, 868 or 915 Megahertz.

15. The edge device according to claim 13, wherein, and a diameter of a communication range of the long-range wide-area network is 1 km.

* * * * *